(12) United States Patent
Lee et al.

(10) Patent No.: US 9,123,970 B2
(45) Date of Patent: Sep. 1, 2015

(54) LITHIUM BATTERY BINDER COMPOSITION, METHOD FOR PREPARING THE SAME AND LITHIUM BATTERY INCLUDING THE SAME

(71) Applicant: Electronics and Telecommunications Research Institute, Daejeon (KR)

(72) Inventors: Young-Gi Lee, Daejeon (KR); Kwang Man Kim, Daejeon (KR); Kunyoung Kang, Daejeon (KR); Dong Ok Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 178 days.

(21) Appl. No.: 13/845,913

(22) Filed: Mar. 18, 2013

(65) Prior Publication Data

US 2014/0011080 A1    Jan. 9, 2014

(30) Foreign Application Priority Data

Jul. 3, 2012    (KR) .................. 10-2012-0072360
Dec. 12, 2012    (KR) .................. 10-2012-0144278

(51) Int. Cl.
*H01M 4/62*    (2006.01)
*H01M 10/0565*    (2010.01)
(Continued)

(52) U.S. Cl.
CPC ............. *H01M 10/0565* (2013.01); *C08L 1/00* (2013.01); *H01M 4/622* (2013.01); *H01M 10/052* (2013.01); *Y02E 60/122* (2013.01)

(58) Field of Classification Search
CPC ............ H01M 10/0565; H01M 4/622; H01M 10/052; Y02E 60/122
USPC .......................................... 429/200, 188, 199
See application file for complete search history.

(56) References Cited

U.S. PATENT DOCUMENTS

2010/0075226 A1*    3/2010    Pham et al. .................... 429/219
2013/0183570 A1*    7/2013    Yong et al. .................... 429/145

FOREIGN PATENT DOCUMENTS

KR    10-0273506 B1    9/2000
KR    10-0278539 B1    10/2000
(Continued)

OTHER PUBLICATIONS

C. Gerbaldi et al., "UV-curable siloxane-acrylate gel-copolymer electrolytes for lithium-based battery applications", Electrochimica Acta, Jan. 25, 2010, pp. 1460-1467, vol. 55, Issue 4.
(Continued)

*Primary Examiner* — Cynthia H Kelly
*Assistant Examiner* — Monique Wills
(74) *Attorney, Agent, or Firm* — Rabin & Berdo, P.C.

(57) ABSTRACT

A lithium battery binder composition in accordance with some example embodiments of the inventive concept may include a lithium ion polymer, an inorganic particle and an organic solution in which a lithium salt is dissolved. The lithium ion polymer may be a cellulosic polymer having sulfonic acid lithium salt or carboxylic acid lithium salt functional group. The lithium ion polymer may be manufactured by substituting hydroxyl group or carboxylic group of cellulosic polymer. The lithium battery binder composition may be used to at least one of an electrolyte, a cathode layer and an anode layer.

13 Claims, 3 Drawing Sheets

(51) Int. Cl.
*H01M 10/052* (2010.01)
*C08L 1/00* (2006.01)

(56) References Cited

FOREIGN PATENT DOCUMENTS

| KR | 10-0374499 | B1 | 2/2003 |
|----|------------|----|--------|
| KR | 10-0609693 | B1 | 7/2006 |
| KR | 10-0760276 | B1 | 9/2007 |

OTHER PUBLICATIONS

Weili Li et al., "A composite microporous gel polymer electrolyte prepared by ultra-violet cross-linking", European Polymer Journal, Feb. 2007, pp. 522-528, vol. 43, Issue 2.

J. R. Nair et al., "UV-cured methacrylic membranes as novel gel-polymer electrolyte for Li-ion batteries", Journal of Power Sources, Apr. 1, 2008, pp. 751-757, vol. 178, Issue 2.

\* cited by examiner

LITHIUM BATTERY BINDER COMPOSITION, METHOD FOR PREPARING THE SAME AND LITHIUM BATTERY INCLUDING THE SAME

CROSS-REFERENCE TO RELATED APPLICATIONS

This U.S. non-provisional patent application claims priority under 35 U.S.C. §119 of Korean Patent Application Nos. 10-2012-0072360, filed on Jul. 3, 2012, and 10-2012-0144278, filed on Dec. 12, 2012, the entire contents of which are hereby incorporated by reference.

BACKGROUND

The present inventive concept herein relates to a lithium battery, and more particularly, to a lithium battery binder composition.

As the importance for a technology of energy storage and conversion becomes high, interest in a lithium battery is greatly being increased. A lithium battery may include an anode, a separator, a cathode and an electrolyte. An electrolyte is composed of lithium salt and a solvent that can dissociate the lithium salt. An electrolyte performs a function of medium that ions can move between a cathode and an anode. Since a lithium battery has very high energy density as compared with other batteries and can be miniaturized, it is actively being studied as a power supply of portable electronic device. As performance of portable electronic device is improved these days, power being consumed in a portable electronic device is being increased. A lithium battery is required to have high power and a good discharge characteristic.

SUMMARY

Embodiments of the inventive concept provide a lithium battery binder composition. The lithium battery binder composition may include a lithium ion polymer, an inorganic particle and an organic solution in which a lithium salt is dissolved.

Embodiments of the inventive concept also provide a method of manufacturing a lithium battery binder composition. The method may include manufacturing a lithium ion polymer represented by a chemical formula below by a substitution reaction of cellulosic polymer; and mixing the lithium ion polymer, an inorganic particle and an organic solution.

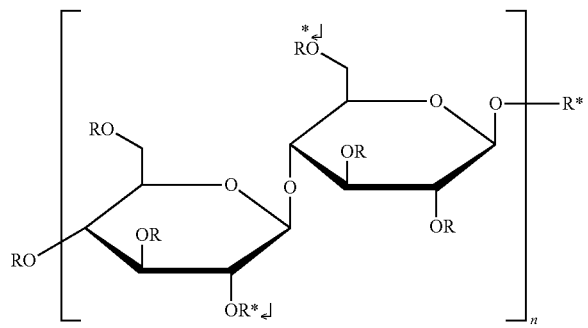

Herein, R is any one selected from

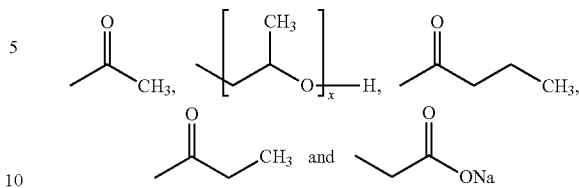

and R* is any one selected from ($SO_3^-Li^+$) substituted by lithium and carboxylic group ($COO^-Li^+$) substituted by lithium, for example, at least one of $SO_3^-Li^+$, $SO_2C_6H_4COO^-Li^+$, $C_6H_3(SO_2NH_2)COO^-Li^+$, $CH(COO^-Li^+)CH_2COO^-Li^+$, $C_6H_3(OH)COO^-Li^+$, $C_6H_2(NO_2)_2COO^-Li^+$, $CH_2C(CH_3)_2COO^-Li^+$, $Si(CH_3)_2(CH_2)_xC(CF_3)_2(CF_2)_ySO_3^-Li^+$, $Si(CH_3)_2(CH_2)_xC(CF_3)_2(CF_2)_yCOO^-Li^+$, $Si(CH_2)_xC(CF_3)_2(CF_2)_ySO_3^-Li^+$, $Si(CH_2)_xC(CF_3)_2(CF_2)_yCOO^-Li^+$, $Si(CF_3)_2(CF_2)_ySO_3^-Li^+$, $Si(CF_3)_2(CF_2)_yCOO^-Li^+$, $Si(CF_2)_ySO_3^-Li^+$, 및 $Si(CF_2)_yCOO^-Li^+$ (x and y are integers of 1 through 10 respectively and n is any one integer selected from 100 through 10000).

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
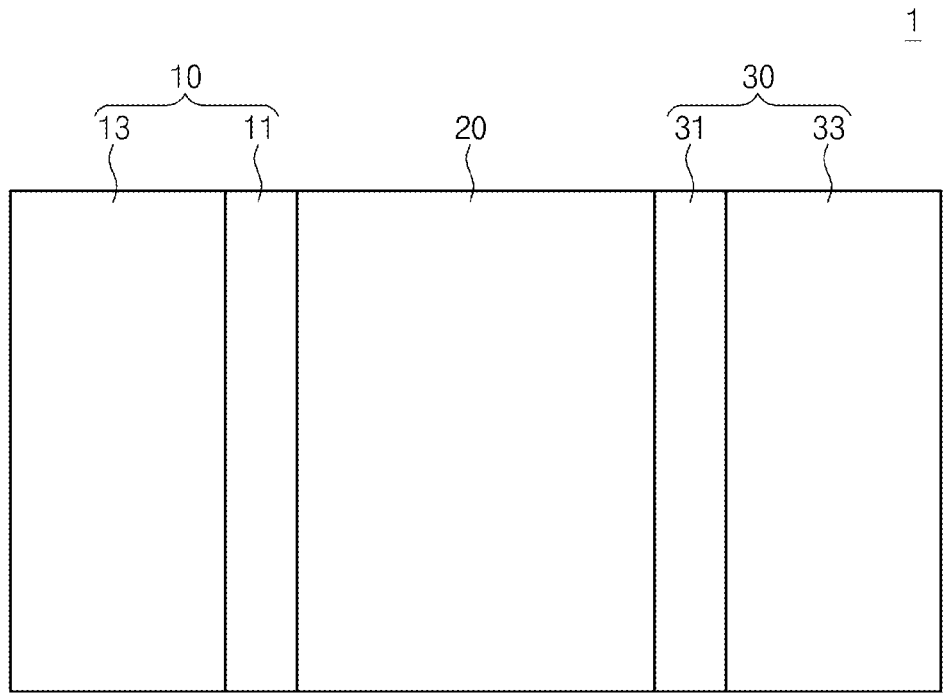
FIG. 1 is a cross sectional view illustrating a lithium battery in accordance with some example embodiments of the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will also be understood that when an element such as a layer, region or substrate is referred to as being "on" or "onto" another element, it may lie directly on the other element or intervening elements or layers may also be present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

Unless otherwise defined, all terms (including technical and scientific terms) used herein have the same meaning as commonly understood by one of ordinary skill in the art to which this invention belongs.

FIG. 1 is a cross sectional view illustrating a lithium battery in accordance with some example embodiments of the inventive concept.

Referring to FIG. 1, a lithium battery 1 may include a cathode 10 and an anode 30 that face each other and are spaced apart from each other and an electrolyte 20 between the cathode 10 and the anode 30.

The electrolyte 20 is in a solid state and may have a film shape. The electrolyte 20 may include a lithium battery binder composition and the lithium battery binder composition may include inorganic particles, organic solvent and lithium ions.

The inorganic particle may include Lithium Aluminum Titanium Phosphate (LATP), Lithium Aluminum Germanium Phosphate (LAGP), Lithium Lanthanum Zirconium Oxide (LLZO) or Lithium Lanthanum Titanium Oxide (LLTO). The inorganic particle may have a size of 10 nm~100 µm, desirably 500 nm~50 µm.

An organic solution may be provided to be impregnated between a lithium ion polymer and an organic particle. An organic solution may include an organic solvent and lithium salt dissolved in the organic solvent. The organic solvent may include ethylene carbonate, propylene carbonate, ethylmethyl carbonate, gammabutyrolactone, triglyme, ethylene glycol, ethylene oxide, ethylene oxide dimethylether, or combinations thereof. The lithium salt may include lithiumperchlorate (LiClO$_4$), lithiumtriflate (LiCF$_3$SO$_3$), lithium hexafluorophosphate (LiPF$_6$), lithium tetrafluorophosphate (LiBF$_4$), lithium trifluoromethansulfonylimid (Lin(CF$_3$SO$_2$)$_2$) or combinations thereof.

The lithium ion polymer may be represented by a chemical formula 1 below and may be cellulosic polymer including functional group having lithium ion, for example, sulfonic acid salt (SO$^{3-}$Li$^+$) functional group and/or carboxylic acid lithium salt (COO$^-$Li$^+$) functional group.

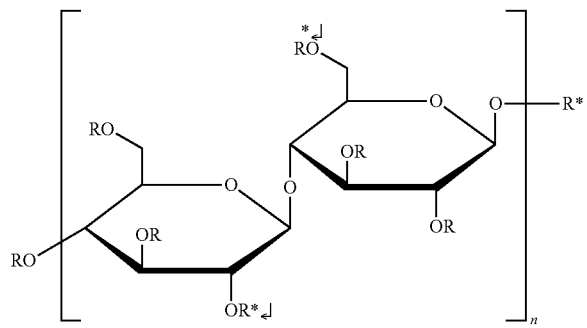

Herein, R includes at least one of

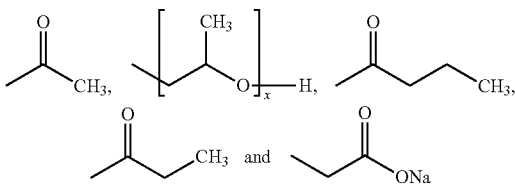

and R* may be represented by sulfonic acid group (SO$^{3-}$Li$^+$) substituted by lithium or carboxylic group (COO$^-$Li$^+$) substituted by lithium, which is at least one of, for example, SO$^{3-}$Li$^+$, SO$_2$C$_6$H$_4$COO$^-$Li$^+$, C$_6$H$_3$(SO$_2$NH$_2$)COO$^-$Li$^+$, CH(COO$^-$Li$^+$)CH$_2$COO$^-$Li$^+$, C$_6$H$_3$(OH)COO$^-$Li$^+$, C$_6$H$_2$(NO$_2$)$_2$COO$^-$Li$^+$, CH$_2$C(CH$_3$)$_2$COO$^-$Li$^+$, Si(CH$_3$)$_2$(CH$_2$)$_x$C(CF$_3$)$_2$(CF$_2$)$_y$SO$^{3-}$Li$^+$, Si(CH$_3$)$_2$(CH$_2$)$_x$C(CF$_3$)$_2$(CF$_2$)$_y$COO$^-$Li$^+$, Si(CH$_2$)$_x$C(CF$_3$)$_2$(CF$_2$)$_y$SO$^{3-}$Li$^+$, Si(CH$_2$)$_x$C(CF$_3$)$_2$(CF$_2$)$_y$COO$^-$Li$^+$, Si(CF$_3$)$_2$(CF$_2$)$_y$SO$^{3-}$Li$^+$, Si(CF$_3$)$_2$(CF$_2$)$_y$COO$^-$Li$^+$, Si(CF$_2$)$_y$SO$_3$$^-$Li$^+$, 및 Si(CF$_2$)$_y$COO$^-$Li$^+$ (x and y are integers of 1 through 10 respectively and n is any one integer selected from 100 through 10000).

The cathode 10 may include a cathode layer 11 which is in contact with the electrolyte 20 and a cathode collector 13 which is spaced apart from the electrolyte 20. The cathode layer 11 may include a cathode active material, a cathode conductive material and the lithium battery binder composition. As the cathode layer 11 includes the lithium battery binder composition, a strong binding strength may exist between the cathode layer 11 and the cathode collector 13 and/or between the cathode layer 11 and the electrolyte 20. Lithium ion polymers may be strongly bound to inorganic particles in the cathode layer 11. Thus, when the lithium battery 1 is driven, lithium ions can smoothly move.

The anode 30 may include an anode layer 31 which is in contact with the electrolyte 20 and an anode collector 33 which is spaced apart from the electrolyte 20. The anode layer 31 may include an anode active material, an anode conductive material and the lithium battery binder composition. A strong binding strength may exist between the anode layer 31 and the electrolyte 20 and/or between the anode layer 31 and the anode collector 33. Ion conductivity of the anode 30 is improved and thereby performance of the lithium battery 1 may be improved.

Figure 2:
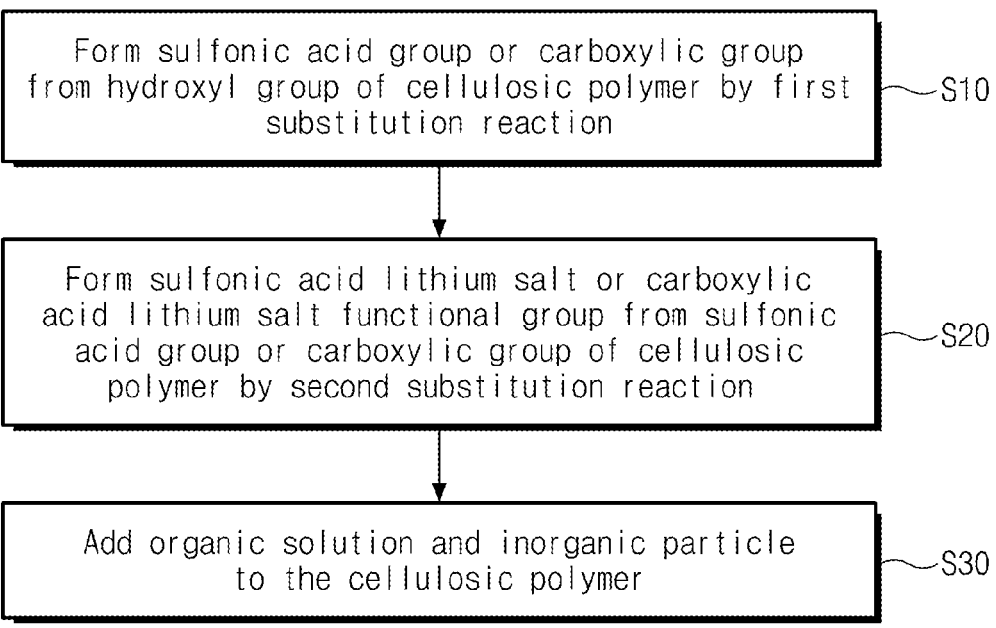
FIG. 2 is a flow chart illustrating a method for preparing a lithium battery binder composition.

FIG. 2 is a flow chart illustrating a method for preparing a lithium battery binder composition.

Referring to FIG. 2, a cellulosic polymer having sulfonic acid group (SO$_3$H) and carboxylic group (COOH) may be formed from cellulosic polymer having high molecular hydroxyl group (OH) of cellulosic polymer by a first substitution reaction (S10). The cellulosic polymer may include at least one of cellulose, methyl cellulose, ethyl cellulose, methyl cellulose, ethyl cellulose, butyl cellulose, hydroxypropyl cellulose, cellulose nitrate, cellulose acetate, cellulose acetate propionate, cellulose acetate butyrate and carboxymethyl cellulose. The cellulosic polymer represents hydrophobic and may have hydroxyl group (OH) and/or carboxylic group (COOH). The hydroxyl group (OH) of the cellulosic polymer may be easily substituted with sulfonic acid group and/or carboxylic group. After cellulosic polymer is added to sulfonic acid solution, it may be stirred under nitrogen atmosphere to be dispersed in a sulfonic acid solution. A dry process and cleaning processes of at least three times may be further performed. The carboxylic group (COOH) of the cellulosic polymer may omit a first substitution reaction.

A cellulosic polymer having sulfonic acid lithium salt ($SO^{3-}Li^+$) or carboxylic acid lithium salt ($COO^-Li^+$) functional group may be manufactured from cellulosic polymer having sulfonic acid group ($SO_3H$) or carboxylic group (COOH) by a second substitution reaction (S20). A cellulosic polymer having sulfonic acid lithium salt ($SO^{3-}Li^+$) functional group or carboxylic acid lithium salt ($COO^-Li^+$) functional group may be formed by substituting a hydrogen ion ($H^+$) of sulfonic acid group ($SO_3H$) or carboxylic group (COOH) with a lithium ion ($Li^+$). The second substitution reaction may be performed by a solution including a lithium ion, for example, neutralization using lithium hydroxide.

The sulfonic acid lithium salt may include at least one of $SO^{3-}Li^+$, $Si(CH_3)_2(CH_2)_xC(CF_3)_2(CF_2)_ySO^{3-}Li^+$, $Si(CH_2)_xC(CF_3)_2(CF_2)_ySO^{3-}Li^+$, $Si(CF_3)_2(CF_2)_ySO^{3-}Li^+$, and $Si(CF_2)_ySO^{3-}Li^+$ (x and y are integers of 1 through 10 respectively). The sulfonic acid lithium salt ($SO^{3-}Li^+$) functional group may be formed by first-substituting hydroxyl group (OH) of cellulosic polymer with sulfonic acid group ($SO_3H$), and then second-substituting the sulfonic acid group ($SO_3H$) with sulfonic acid lithium salt ($SO^{3-}Li^+$) again. The substituted sulfonic acid lithium salt ($SO^{3-}Li^+$) may have 0.001 to 99.999 weight percent, for example, 0.01 to 50 weight percent of the hydroxyl group (OH) of cellulosic polymer.

The carboxylic acid lithium salt may include at least one of $SO_2C_6H_4COO^-Li^+$, $C_6H_3(SO_2NH_2)COO^-Li^+$, $CH(COO^-Li^+)CH_2COO^-Li^+$, $C_6H_3(OH)COO^-Li^+$, $C_6H_2(NO_2)_2COO^-Li+$, $CH_2C(CH_3)_2COO^-Li^+$, $Si(CH_3)_2(CH_2)_xC(CF_3)_2(CF_2)_yCOO^-Li^+$, $Si(CH_2)_xC(CF_3)_2(CF_2)_yCOO^-Li^+$, $Si(CF_3)_2(CF_2)_yCOO^-Li^+$, and $Si(CF_2)_yCOO^-Li^+$ (herein, x and y are integers of 1 through 10 respectively). For examples, the carboxylic acid lithium salt ($COO^-Li^+$) functional group may be manufactured by first substituting hydroxyl group (OH) with carboxylic group (COOH), and then second substituting the carboxylic group (COOH). For another examples, the sulfonic acid lithium salt ($SO^{3-}Li^+$) functional group may be formed by second substituting carboxylic group (COOH) of cellulosic polymer. The manufacture of lithium ion polymer represented by the chemical formula 1 may be completed. The lithium ion polymer may hydrophilic property.

Lithium battery binder composition may be manufactured by adding an organic solution and inorganic particles to lithium ion polymer (S30). The organic solution may include an organic solvent in which lithium salt is dissolved. The organic solution may be added so that it has 100 to 800 weight percent of the lithium ion polymer. The inorganic particle may be the inorganic particle described in FIG. 1. The inorganic particle may be added so that it has 1 to 2000 weight percent of the lithium ion polymer.

With reference to experiment examples of the inventive concept, the manufacture of lithium battery binder composition and a result of characteristic evaluation of the lithium battery binder composition will be described in more detail.

The manufacture of Lithium Battery Binder Composition

Experiment Example 1

The Manufacture of Lithium Ion

Ethyl cellulose of 10 g is added to 1,2-dichloroethane of 400 mL and is stirred under nitrogen atmosphere at a rate greater than 400 rpm. Chloro-sulfonic acid (Cl—$SO_3H$) dissolved in the 1,2-dichloroethane is added to the ethyl cellulose solution and is stirred for 24 hours. As a result, ethyl cellulosic polymer having sulfonic acid group is manufactured. The ethyl cellulosic polymer having sulfonic acid group is filtered and a dry process and cleaning processes of three times may be performed. The ethyl cellulosic polymer having sulfonic acid group is titrated by lithium hydroxide (LiOH) solution and thereby ethyl cellulosic polymer having sulfonic acid lithium salt may be manufactured.

(Measure of Ion Conductivity of Lithium Ion)

Ethyl cellulosic polymer having sulfonic acid lithium salt is dissolved in N-methyl pyrrolidone (NMP) and an organic solution may be added thereto. After ethylene carbonate and propylene carbonate are mixed at a weight ratio of 50:50, lithium hexafluorophosphate ($LiPF_6$) is added thereto and thereby an organic solution may be manufactured. An organic solution may be added so that it has 100, 200, 400 and 600 weight percent of ethyl cellulosic polymer having sulfonic acid lithium salt. Ion conductivity may be measured according to a change of content ratio of an organic solution to ethyl cellulosic polymer.

Experiment Example 2

In the same manner as the experiment example 1, a lithium ion may be manufactured and ion conductivity of the lithium ion may be measured. In the experiment example 2, hydroxypropyl cellulose was used instead of the ethyl cellulose.

Comparison Example 1

Ion conductivity may be measured in the same manner as the experiment example 1. In the present embodiment, ethyl cellulose was used instead of ethyl cellulosic polymer having sulfonic acid salt.

Comparison Example 2

Ion conductivity may be measured in the same manner as the experiment example 1. In the present embodiment, hydroxypropyl cellulose was used instead of ethyl cellulosic polymer having sulfonic acid salt.

The Manufacture of an Electrolyte

Experiment Example 3

The Manufacture of Lithium Battery Binder Composition

Ethyl cellulosic polymer having sulfonic acid lithium salt is dissolved in N-methyl pyrrolidone (NMP) and an organic solution may be added thereto. After ethylene carbonate and propylene carbonate are mixed at a weight ratio of 50:50, lithium hexafluorophosphate ($LiPF_6$) is added thereto and thereby an organic solution may be manufactured. An organic solution may be added so that it has 100, 200, 400 and 600 weight percent of ethyl cellulosic polymer having sulfonic acid lithium salt. Lithium aluminum titanium phosphate (LATP) may be added so that it has 30 weight percent of ethyl cellulosic polymer having sulfonic acid lithium salt.

(The Manufacture of an Electrolyte)

An electrolyte film was manufactured by casting lithium battery binder composition.

Experiment Example 4

Lithium battery binder composition and an electrolyte may be manufactured in the same manner as the experiment example 3. In the present experiment, the lithium ion of the experiment example 2 was used Comparison Example 3

Lithium battery binder composition and an electrolyte may be manufactured in the same manner as the experiment example 3. In the present experiment, the ethyl cellulose of the comparison example 1 was used instead of ethyl cellulosic polymer having sulfonic acid salt.

Comparison Example 4

Lithium battery binder composition and an electrolyte may be manufactured in the same manner as the experiment example 3. In the present experiment, the hydroxypropyl cellulose of the comparison example 2 was used instead of ethyl cellulosic polymer having sulfonic acid salt.

Figure 3:
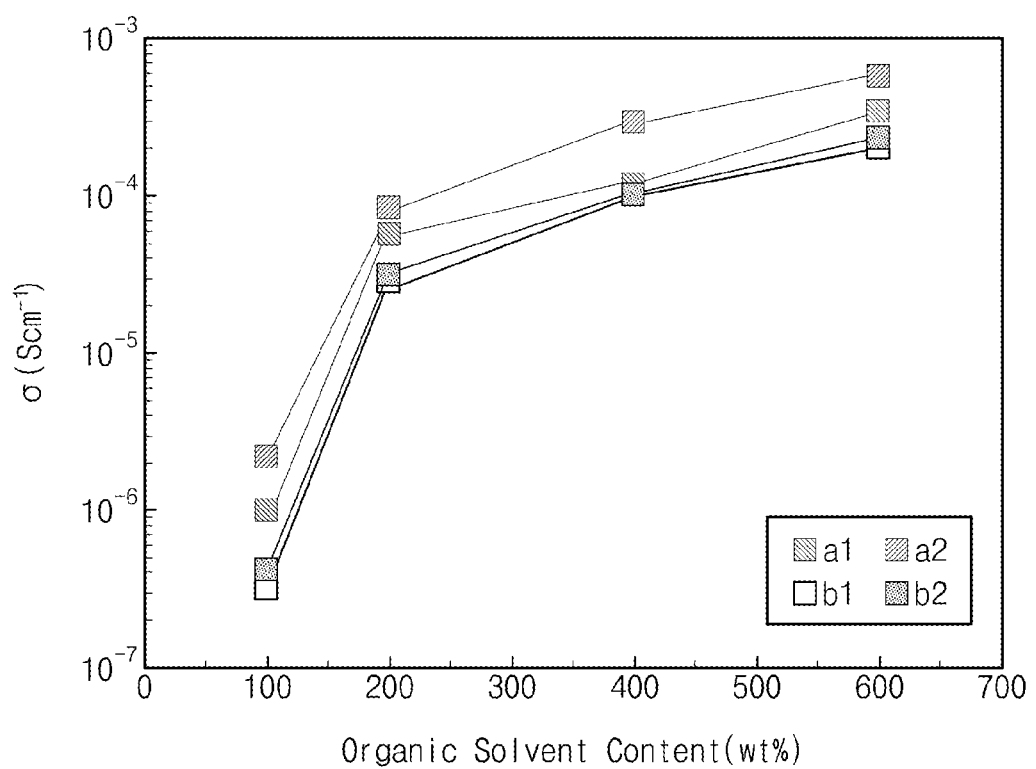
FIG. 3 is an ion conductivity evaluation result of a lithium battery binder composition.

FIG. 3 is an ion conductivity evaluation result of a lithium battery binder composition in experiment examples and comparison examples.

Referring to FIG. 3, it can be appreciated that the experiment example 1 (a1) has higher conductivity than the comparison example 1 (b1) and the experiment example 2 (a2) has higher conductivity than the comparison example 2 (b2). In the case that the experiments examples 1 and 2 include an organic solution having more than 400 weight percent of lithium ion polymer, it may be observed that the experiments examples 1 and 2 have ion conductivity of more than $10^{-3}$ S/cm. As the experiment examples 1 and 2 (a1 and a2) have sulfonic acid group $SO^{3-}Li^+$ and/or carboxylic acid lithium salt functional group $COO^-Li^+$, they can represent ion conductivity.

Figure 4:
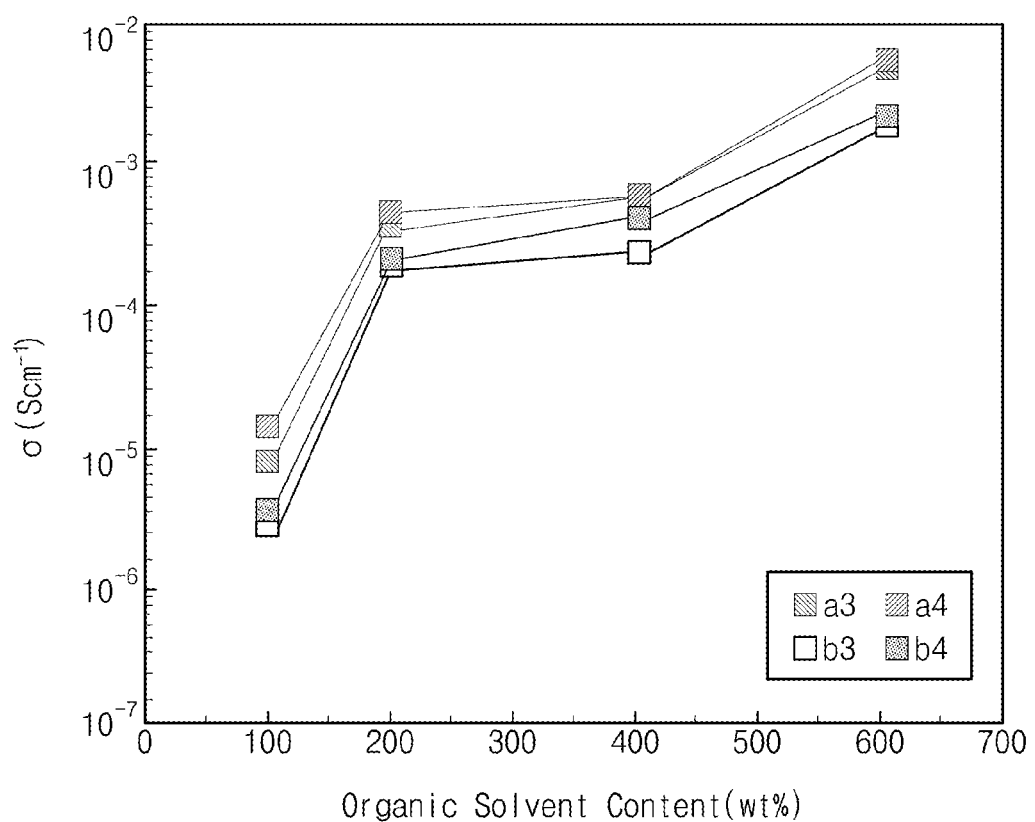
FIG. 4 is an ion conductivity evaluation result of an electrolyte.

FIG. 4 is an ion conductivity evaluation result of an electrolyte.

The ion conductivity evaluation was performed by measuring ion conductivity (y axis) at room temperature in accordance with a change (x axis) of a content ratio of an organic solution to lithium ion polymer.

Referring to FIG. 4, it can be appreciated that the experiment example 3 (a3) has higher conductivity than the comparison example 3 (b3) and the experiment example 4 (a4) has higher conductivity than the comparison example 4 (b4). In the case that the experiments examples 3 and 4 (a3, a4) include an organic solution having more than 400 weight percent of lithium ion polymer, it may be observed that the experiments examples 3 and 4 have ion conductivity of more than $10^{-4}$ S/cm. Since lithium ion polymer has sulfonic acid lithium salt ($SO^{3-}Li^+$) and/or carboxylic acid lithium salt ($COO^-Li^+$) functional group, the lithium ion polymer can be strongly bound to an inorganic particle. The electrolyte 20 has high ion conductivity and can be bound to the cathode layer 11 and/or the anode layer 31.

Lithium battery binder composition in accordance with the inventive concept includes a lithium ion polymer and may be used as an electrolyte, a cathode layer and an anode layer in a lithium battery. Lithium ion polymer may be cellulosic polymer having sulfonic acid lithium salt ($SO^{3-}Li^+$) and/or carboxylic acid lithium salt ($COO^-Li^+$) functional group. A strong binding strength exists between an electrode layer (cathode layer and/or anode layer) including lithium battery binder composition and a collector and/or between an electrode layer (cathode layer and/or anode layer) including lithium battery binder composition and an electrolyte. Movement of lithium ions may be improved in the electrode. An electrolyte including lithium battery binder composition may have high ion conductivity, flexibility and mechanical strength.

Although the present invention has been described in terms of specific embodiments, the present invention is not intended to be limited by the embodiments described herein. Thus, the scope may be determined by the following claims.

What is claimed is:

1. A lithium battery binder composition, comprising:
   a cellulosic polymer represented by a chemical formula of

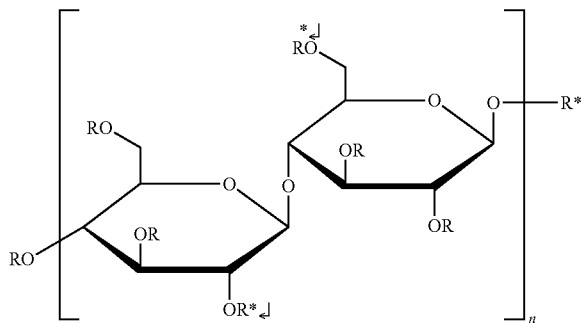

where,
   R is at least one of

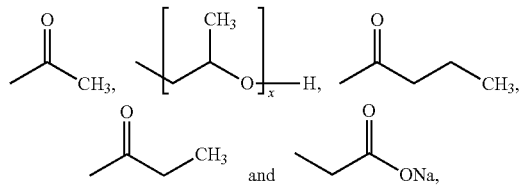

R* is a sulfonic acid group ($SO^{3-}Li^+$) substituted by lithium or a carboxylic group ($COO^-Li^+$) substituted by lithium, and
   n is an integer selected from 100 through 10000;
   an inorganic particle; and
   an organic solution in which lithium salt is dissolved.

2. The lithium battery binder composition of claim 1, wherein
   R* is at least one selected from $SO^{3-}Li^+$, $SO_2C_6H_4COO^-Li^+$, $C_6H_3(SO_2NH_2)COO^-Li^+$, $CH(COO^-Li^+)CH_2COO^-Li^+$, $C_6H_3(OH)COO^-Li^+$, $C_6H_2(NO_2)_2COO^-Li^+$, $CH_2C(CH_3)_2COO^-Li^+$, $Si(CH_3)_2(CH_2)_xC(CF_3)_2(CF_2)_ySO^{3-}Li^+$, $Si(CH_3)_2(CH_2)_xC(CF_3)_2(CF_2)_yCOO^-Li^+$, $Si(CH_2)_xC(CF_3)_2(CF_2)_ySO^{3-}Li^+$, $Si(CH_2)_xC(CF_3)_2(CF_2)_yCOO^-Li^+$, $Si(CF_3)_2(CF_2)_ySO^{3-}Li^+$, $Si(CF_3)_2(CF_2)_yCOO^-Li^+$, $Si(CF_2)_ySO_3^-Li^+$, and $Si(CF_2)_yCOO^-Li^+$, wherein x and y are integers of 1 through 10.

3. The lithium battery binder composition of claim 1, wherein the cellulosic polymer is a derivative selected from cellulose, methyl cellulose, ethyl cellulose, methyl cellulose, ethyl cellulose, butyl cellulose, hydroxypropyl cellulose, cellulose nitrate, cellulose acetate, cellulose acetate propionate, cellulose acetate butyrate or carboxymethyl cellulose.

4. A method of manufacturing lithium battery binder composition comprising:
   manufacturing a lithium ion polymer represented by a chemical formula and formed by a substitution reaction of a cellulosic polymer; and mixing the lithium ion polymer, an inorganic particle and an organic solution, wherein the chemical formula is

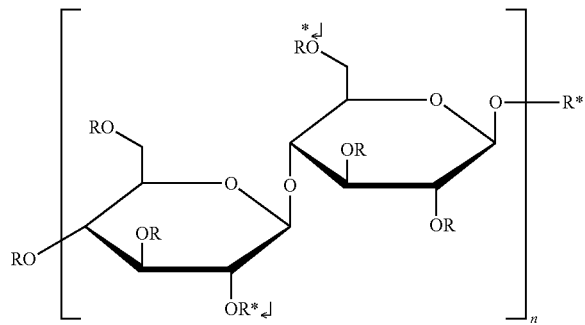

where,
R is any one selected from

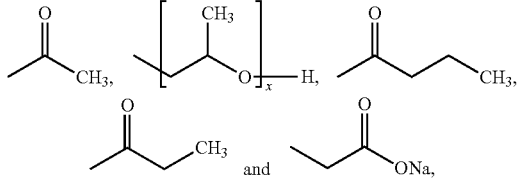

R* is any one selected from $SO^{3-}Li^+$, $SO_2C_6H_4COO^-Li^+$, $C_6H_3(SO_2NH_2)COO^-Li^+$, $CH(COO^-Li^+)CH_2COO^-Li^+$, $C_6H_3(OH)COO^-Li^+$, $C_6H_2(NO_2)_2COO^-Li^+$, $CH_2C(CH_3)_2COO^-Li^+$, $Si(CH_3)_2(CH_2)_xC(CF_3)_2(CF_2)_ySO^{3-}Li^+$, $Si(CH_3)_2(CH_2)_xC(CF_3)_2(CF_2)_yCOO^-Li^+$, $Si(CH_2)_xC(CF_3)_2(CF_2)_ySO^{3-}Li^+$, $Si(CH_2)_xC(CF_3)_2(CF_2)_yCOO^-Li^+$, $Si(CF_3)_2(CF_2)_ySO^{3-}Li^+$, $Si(CF_3)_2(CF_2)_yCOO^-Li^+$, $Si(CF_2)_ySO_3^-Li^+$, and $Si(CF_2)_yCOO^-Li^+$, wherein x and y are integers of 1 through 10 respectively, and n is any one integer selected from 100 through 10000.

5. The method of manufacturing lithium battery binder composition of claim 4, wherein manufacturing the lithium ion polymer comprises:
manufacturing a cellulosic polymer having a sulfonic acid group from the cellulosic polymer having a hydroxyl group by a first substitution reaction; and
manufacturing a cellulosic polymer having a sulfonic acid lithium salt functional group from the cellulosic polymer having a sulfonic acid group by a second substitution reaction.

6. The method of manufacturing lithium battery binder composition of claim 5, wherein the cellulosic polymer having a sulfonic acid lithium salt functional group is substituted so that it has a weight percent of 0.01 through 50 as compared with the cellulosic polymer having the hydroxyl group.

7. The method of manufacturing lithium battery binder composition of claim 5, wherein the second substitution reaction comprises titration of the cellulosic polymer having the sulfonic acid group using a lithium solution.

8. The method of manufacturing lithium battery binder composition of claim 4, wherein manufacturing the lithium ion polymer comprises substituting a carboxylic group of the cellulosic polymer with a carboxylic acid lithium salt.

9. The method of manufacturing lithium battery binder composition of claim 4, wherein the cellulosic polymer is cellulose, methyl cellulose, ethyl cellulose, methyl cellulose, ethyl cellulose, butyl cellulose, hydroxypropyl cellulose, cellulose nitrate, cellulose acetate, cellulose acetate propionate, cellulose acetate butyrate or carboxymethyl cellulose.

10. A lithium battery, comprising:
a cathode comprising a cathode collector and a cathode layer formed on the cathode collector;
an anode comprising an anode collector and an anode formed on the anode collector, the anode being spaced apart from the cathode and facing the cathode; and
an electrolyte disposed between the cathode and the anode, wherein at least one of the cathode layer, the anode layer and the electrolyte comprises a cellulosic polymer derivative that is represented by a chemical formula of

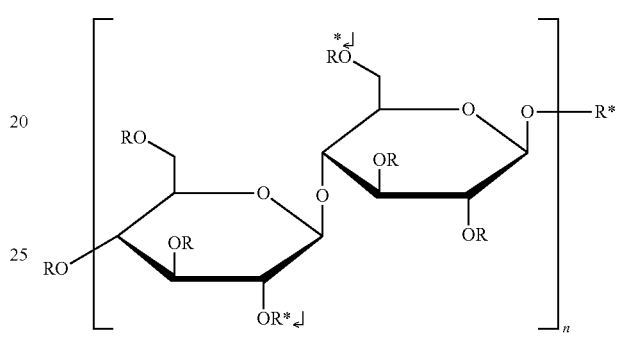

where,
R is at least one of

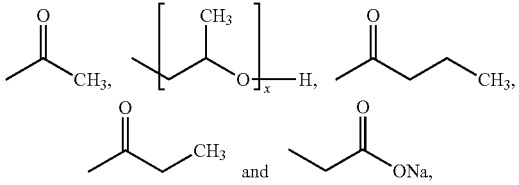

R* is a sulfonic acid group ($SO^{3-}Li^+$) substituted by lithium or a carboxylic group ($COO^-Li^+$) substituted by lithium, and
n is an integer selected from 100 through 10000.

11. The lithium battery of claim 10, wherein
R* is at least one selected from $SO^{3-}Li^+$, $SO_2C_6H_4COO^-Li^+$, $C_6H_3(SO_2NH_2)COO^-Li^+$, $CH(COO^-Li^+)CH_2COO^-Li^+$, $C_6H_3(OH)COO^-Li^+$, $C_6H_2(NO_2)_2COO^-Li^+$, $CH_2C(CH_3)_2COO^-Li^+$, $Si(CH_3)_2(CH_2)_xC(CF_3)_2(CF_2)_ySO^{3-}Li^+$, $Si(CH_3)_2(CH_2)_xC(CF_3)_2(CF_2)_yCOO^-Li^+$, $Si(CH_2)_xC(CF_3)_2(CF_2)_ySO^{3-}Li^+$, $Si(CH_2)_xC(CF_3)_2(CF_2)_yCOO^-Li^+$, $Si(CF_3)_2(CF_2)_ySO^{3-}Li^+$, $Si(CF_3)_2(CF_2)_yCOO^-Li^+$, $Si(CF_2)_ySO_3^-Li^+$, and $Si(CF_2)_yCOO^-Li^+$, wherein x and y are integers of 1 through 10.

12. The lithium battery of claim 10, wherein the electrolyte has a film shape and comprises an organic solution in which an inorganic particle and lithium salt are dissolved.

13. The lithium battery of claim 10, wherein the cellulosic polymer derivative is a derivative selected from cellulose, methyl cellulose, ethyl cellulose, methyl cellulose, ethyl cellulose, butyl cellulose, hydroxypropyl cellulose, cellulose nitrate, cellulose acetate, cellulose acetate propionate, cellulose acetate butyrate or carboxymethyl cellulose.

* * * * *